(12) United States Patent
Ham et al.

(10) Patent No.: US 8,064,021 B2
(45) Date of Patent: Nov. 22, 2011

(54) LIGHT ILLUMINATING UNIT AND METHOD OF FABRICATING A LIQUID CRYSTAL DISPLAY DEVICE USING SAME

(75) Inventors: Yong Sung Ham, Anyang-si (KR); Hyun Ho Kim, Guro-gu (KR); Young Kwon Kang, Suwon-si (KR)

(73) Assignee: LG Display Co., Ltd., Seoul (KR)

( * ) Notice: Subject to any disclaimer, the term of this patent is extended or adjusted under 35 U.S.C. 154(b) by 1200 days.

(21) Appl. No.: 11/644,935

(22) Filed: Dec. 26, 2006

(65) Prior Publication Data

US 2007/0153184 A1     Jul. 5, 2007

(30) Foreign Application Priority Data

Dec. 29, 2005   (KR) .................... 10-2005-0133669
Dec. 29, 2005   (KR) .................... 10-2005-0133675

(51) Int. Cl.
    *G02F 1/1333* (2006.01)
(52) U.S. Cl. ......... 349/124; 349/123; 349/125; 349/126
(58) Field of Classification Search ........... 349/123–126
    See application file for complete search history.

(56) References Cited

FOREIGN PATENT DOCUMENTS

| CN | 1591143 | 3/2005 |
|----|---------|--------|
| JP | 10-090684 | 4/1998 |
| JP | 2001-117102 | 4/2001 |
| JP | 2003-149828 | 5/2003 |

*Primary Examiner* — Phu Vu
(74) *Attorney, Agent, or Firm* — McKenna Long & Aldridge, LLP

(57) ABSTRACT

Provided is a light illuminating unit for emitting partially polarized light having an anisotropic illuminance distribution onto a polarizing device. The light illuminating unit includes: a light generator to emit light having an anisotropic illuminance distribution; and a polarizing device to receive light from the light generator.

33 Claims, 22 Drawing Sheets

FIG. 5A

| THE NUMBER OF QUARZ SUBSTRATES | POLARIZATION DEGREE | POWER EFFICIENCY(%) |
|---|---|---|
| 0 | 0.00 | 100 |
| 1 | 0.10 | 81 |
| 2 | 0.23 | 70 |
| 3 | 0.32 | 63 |
| 4 | 0.39 | 59 |
| 5 | 0.45 | 55 |
| 6 | 0.50 | 51 |

FIG. 5B

| THE NUMBER OF QUARZ SUBSTRATES | POLARIZATION DEGREE | POWER EFFICIENCY(%) |
|---|---|---|
| 0 | 0.08 | 100 |
| 1 | 0.24 | 83 |
| 2 | 0.35 | 73 |
| 3 | 0.44 | 67 |
| 4 | 0.5 | 63 |

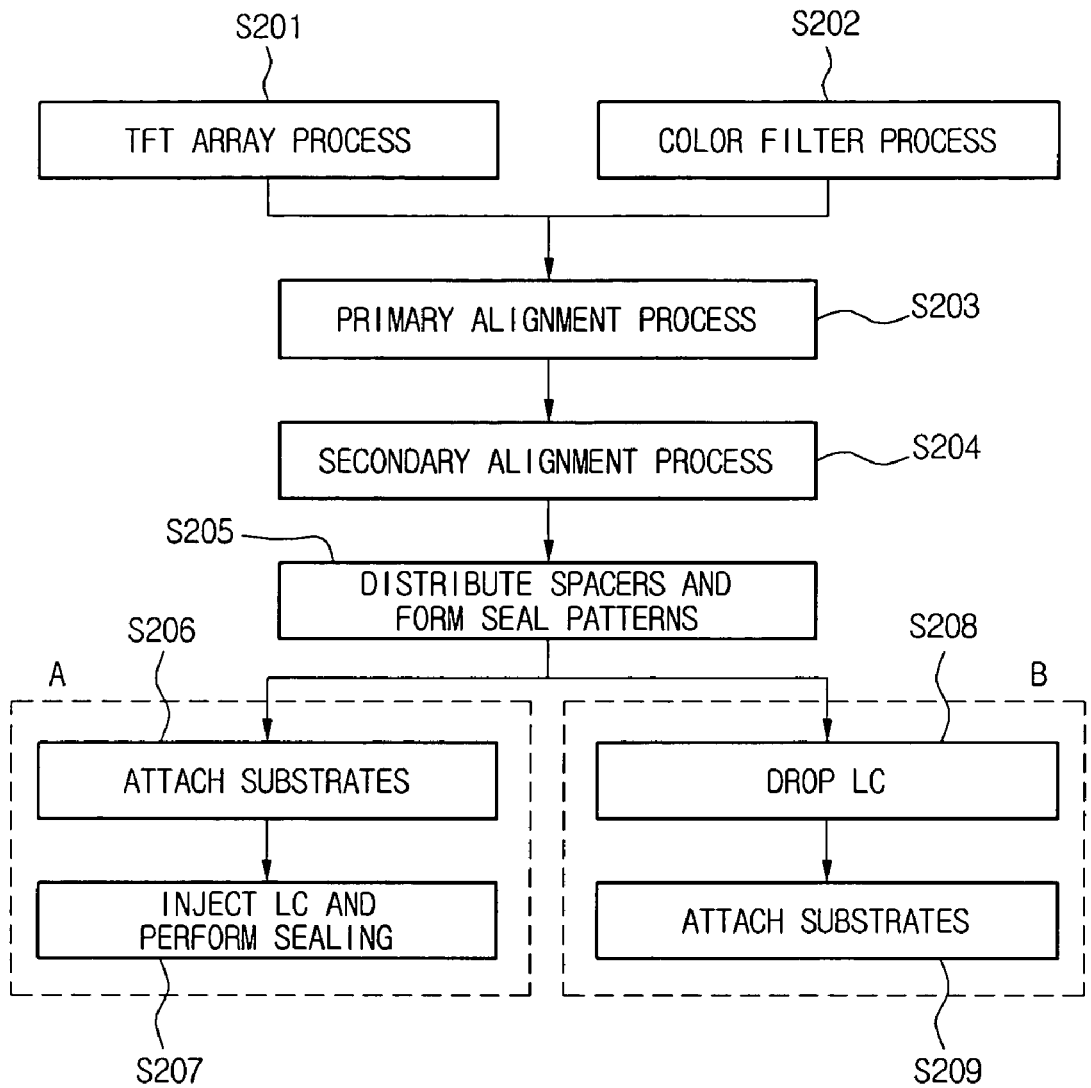

RUBBING DIRECTION

RUBBING DIRECTION

POLARIZATION DIRECTION

FIG. 20

| POLARIZATION DEGREE | RUBBING | 0.4 | 0.5 | 0.7 |
|---|---|---|---|---|
| MICROSCOPE PHOTO | | | | |

LIGHT ILLUMINATING UNIT AND METHOD OF FABRICATING A LIQUID CRYSTAL DISPLAY DEVICE USING SAME

This application claims the benefit of Korean Patent Application No. 10-2005-0133669, filed Dec. 29, 2005, and of Korean Patent Application No. 10-2005-0133675, filed Dec. 29, 2005, which are hereby incorporated by reference for all purposes as if fully set forth herein.

BACKGROUND OF THE INVENTION

1. Field of the Invention

The present invention relates to a light illuminating unit, and more particularly, to a light illuminating unit for processing of an alignment layer of a liquid crystal display (LCD) device, and a manufacturing method thereof.

2. Discussion of the Related Art

A typical LCD device includes two substrates each having electrodes on one surface. The two substrates are arranged such that the surfaces on which the electrodes are formed face each other, and a liquid crystal layer is interposed between the two substrates. A LCD device having the described construction displays an image by varying the alignment of molecules of the liquid crystal layer using an electric field generated by a voltage applied to the two substrates. As the electric field is varied the alignment of the liquid crystal molecules changes, changing the light transmittance of the liquid crystal layer in correspondence with the applied voltage to generate an image.

A typical LCD device includes a liquid crystal (LC) panel for displaying an image and a driving unit for applying a driving signal to the LC panel. The first and second substrates of the LC panel are bonded together with a predetermined intervening space between the two substrates, and with an LC layer interposed between the two substrates.

LCD devices may be of various types. In an in-plane switching (ISP) mode LCD device the first substrate includes a plurality of gate lines separated by a constant interval in a first direction; a plurality of data lines separated by a constant interval and arranged in a perpendicular direction to the gate lines; pixel electrodes formed in a comb shape having a plurality of teeth in the pixel regions defined by the gate lines and the data lines crossing each other; a common electrode alternately formed with the teeth of the pixel electrodes; and a plurality of thin film transistors (TFTs) to be switched in response to a signal from the gate lines to transfer signals of the data lines to the pixel electrodes.

The second substrate includes a black matrix layer for blocking light passing through portions other than the pixel regions, and a color filter layer for realizing colors.

An alignment layer is formed on each of the first and second substrates. The alignment layer is processed to provide an initial alignment direction for the molecules of the liquid crystal layer of the LCD device.

The alignment methods of the related art for processing the alignment layer include a rubbing method.

In the rubbing method, an alignment material such as polyimide (PI) is coated on a substrate, and mechanical friction is generated using a rubbing cloth to generate fine grooves in the alignment material to induce an alignment direction. The rubbing method is widely used in the industry because it can be applied over large areas at a high speed.

However, the shape of the grooves formed in the alignment layer changes with variations in the amount of friction generated during the rubbing process. The variations in the shape of the grooves may result in inhomogeneous alignment of liquid crystal molecules of the liquid crystal layer. Irregular phase distortion and light scattering due to the inhomogeneous alignment of the liquid crystal molecules may reduce the performance of an LCD device.

In addition, dusts and static electricity generated during rubbing processes reduce the manufacturing yield for the resulting LCD devices.

Various methods for manufacturing a liquid crystal alignment layer without the use of physical contact are being studied in order to solve the problems of the rubbing method. Among the studied methods are included techniques using photo-alignment technology. In the photo-alignment technology, a liquid crystal alignment layer is processed by illuminating polarized ultraviolet (UV) light onto a polymer film.

In contrast to the rubbing method, alignment methods using photo-alignment technology do not generate dusts and static electricity and can avoid the yield reduction caused by dust and static electricity. In addition, by allowing the liquid crystal molecules to be uniformly arranged over an entire surface of an alignment layer and the uniformity of the alignment of the liquid crystal layer can be improved, and phase distortion or light scattering problems can be eliminated or reduced.

FIG. 1 is a schematic diagram illustrating an alignment process of a liquid crystal alignment layer according to a related art rubbing process.

Referring to FIG. 1, according to the related art rubbing process, a polymer compound such as polyimide or the like is coated on a substrate 2. Thereafter, a rubbing drum 7 rotates at a high speed to rub the surface of the coated substrate 2 so that microgrooves are formed on the surface of the polymer compound. Herein, the rubbing drum 7 is rolled up in a predetermined cloth with nylon or polyester rayon.

Through the rubbing process, the liquid crystal molecules are aligned at a predetermined pretilt angle on the surface of the alignment agent. Meanwhile, since the rubbing process has is simple and adaptive for scaling up the size of device and usable in high-speed production, it is widely used industrially.

However, the microgrooves formed in the alignment layer may have non-uniform shapes depending on the amount of frictional force between the cloth and the alignment layer 1 during rubbing. As a result, the alignment of the liquid crystal molecules can be non-uniform resulting in phase distortion and light scattering. Moreover, the substrate 2 may be damaged due to electrostatic discharge (ESD) generated while rubbing the surface of the polymer. Further, there is a problem that a production yield decreases due to the micro dust generated from the rubbing drum 7.

SUMMARY OF THE INVENTION

Accordingly, the present invention is directed to a light illuminating unit and a manufacturing method thereof that substantially obviate one or more problems due to limitations and disadvantages of the related art.

An advantage of the present invention is to provide a light illuminating unit and a manufacturing method thereof, capable of improving polarization efficiency and a power efficiency by modifying a structure of a polarization system and thus allowing light partially polarized and having an anisotropic illuminance distribution to be incident to a polarizing device.

Additional features and advantages of the invention will be set forth in the description which follows, and in part will be apparent from the description, or may be learned from practice of the invention. The objectives and other advantages of the invention will be realized and attained by the structure particularly pointed out in the written description and claims hereof as well as the appended drawings.

To achieve these objects and other advantages and in accordance with the purpose of the present invention, as embodied and broadly described herein, there is provided a light illuminating unit including: a light generator to emit light having an anisotropic illuminance distribution; and a polarizing device to receive light from the light generator.

In another aspect of the present invention, there is provided a method of fabricating a liquid crystal display device including: coating an alignment layer on a substrate; preparing a light illuminating unit having an anisotropic structure to generate light having an anisotropic illuminance distribution; transmitting light having an anisotropic illuminance distribution from the light illuminating unit to a polarizing device to generate polarized light; and irradiating polarized light from the polarizing device onto the alignment layer.

In another aspect of the present invention, there is provided a method of fabricating liquid crystal display device including: preparing a first substrate and a second substrate; coating a first alignment layer on an alignment substrate selected from one of the first substrate and the second substrate; transmitting light having an anisotropic illuminance distribution from a light illuminating unit to a polarizing device to generate polarized light; irradiating polarized light from the polarizing device onto the first alignment layer; and disposing a liquid crystal layer between the first and second substrates.

In another aspect of the present invention, there is provided a method of fabricating liquid crystal display device including: forming gate lines and a common line on a first substrate; forming data lines crossing the gate lines on the first substrate; forming a plurality of common electrodes parallel to the data lines, and forming pixel electrodes disposed alternately with the common electrodes; forming a first alignment layer on the first substrate including the pixel electrodes; rubbing the first alignment layer in a first rubbing direction; transmitting light having anisotropic illuminance distribution from a light illuminating unit to a polarizing device generating polarized light; and irradiating polarized light from the polarizing device, having polarization of 0.5 or more onto the first alignment layer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings:

FIG. 5A is a view illustrating a polarization degree and a power efficiency depending on the number of quartz substrates in a related art light illuminating unit;

FIG. 5B is a view illustrating a power efficiency depending on the number of quartz substrates in a light illuminating unit according to the present invention;

FIG. 15 is a flowchart illustrating a method for manufacturing an in-plane switching mode LCD device according to the present invention;

FIG. 20 is a microscope photo of an in-plane switching mode LCD device illustrating improvement in black brightness depending on a polarization degree.

DETAILED DESCRIPTION OF THE ILLUSTRATED EMBODIMENTS

Reference will now be made in detail to an embodiment of the present invention, examples of which are illustrated in the accompanying drawings.

Figure 1:
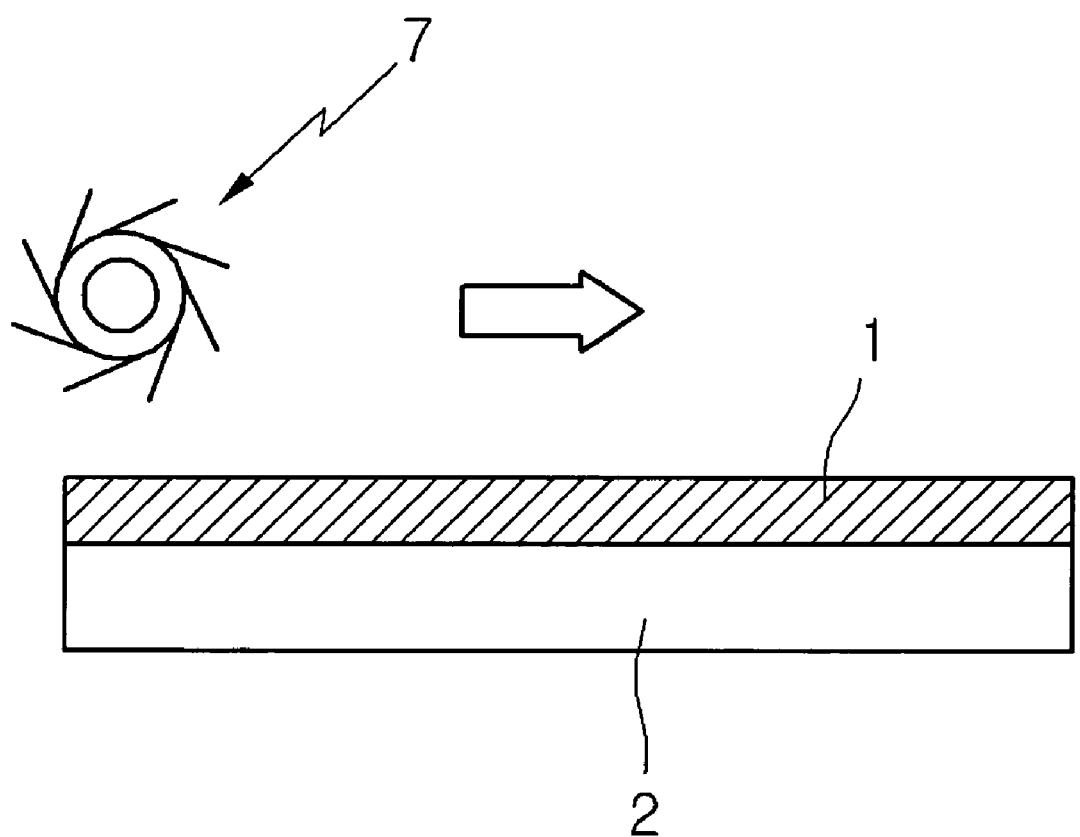
FIG. 1 is a schematic diagram illustrating an alignment process of a liquid crystal alignment layer according to a related art rubbing process.
Figure 2:
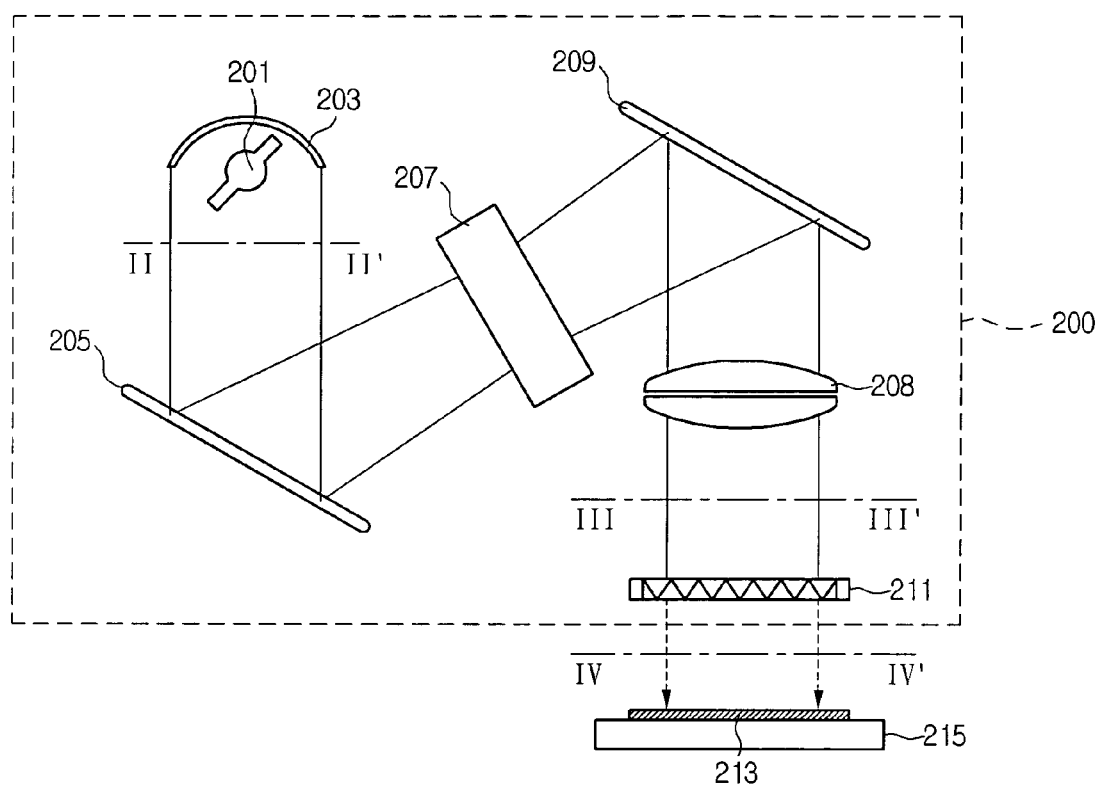
FIG. 2 is a schematic view of a light illuminating unit according to an embodiment of the present invention.
Figure 3A:
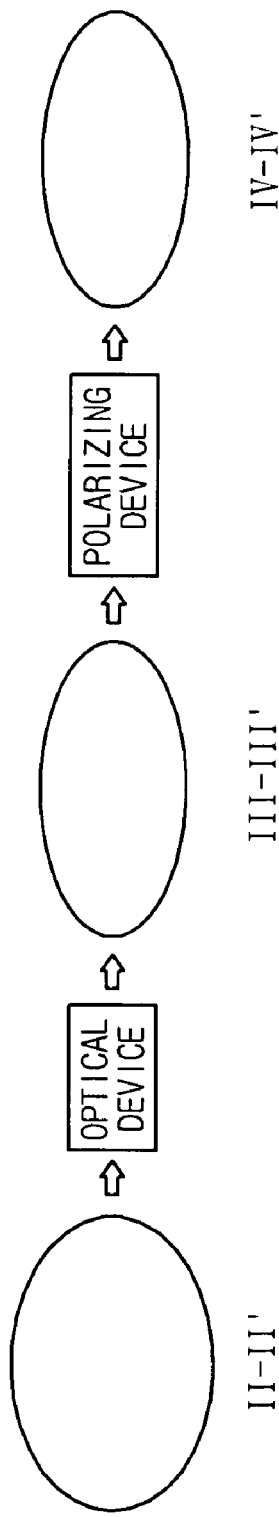
FIG. 3A is a view illustrating illuminance distribution on a plane over lines II-II', III-III', IV-IV' of FIG. 2.
Figure 3B:
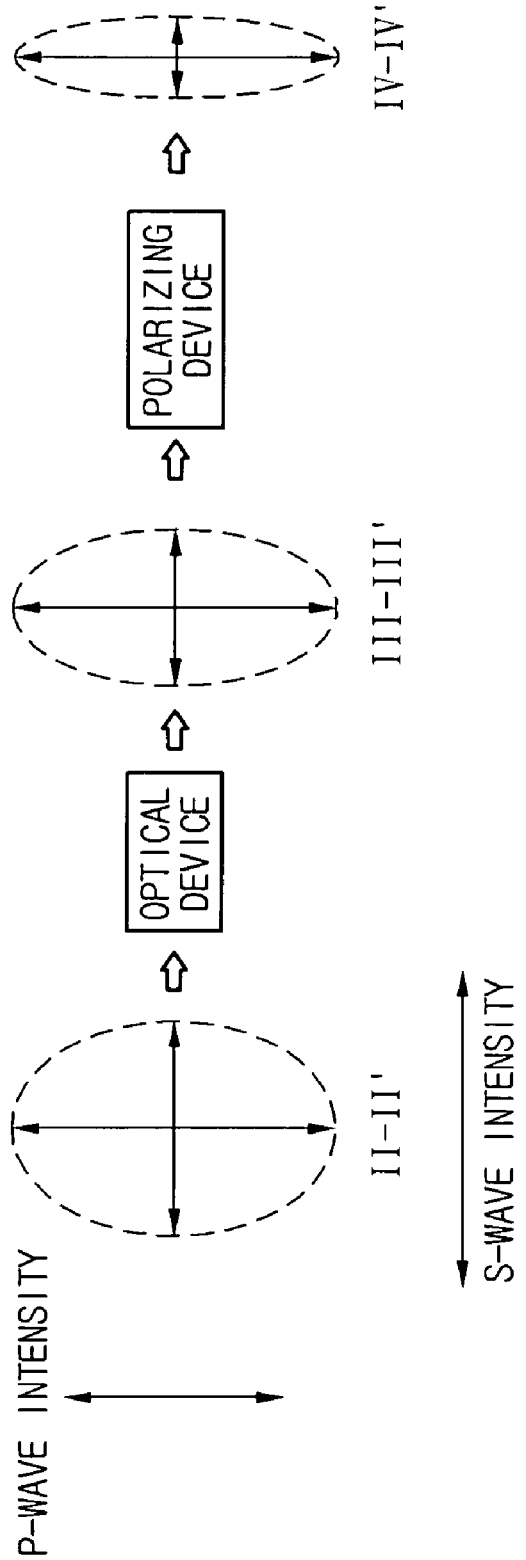
FIG. 3B is a view illustrating light component distribution on a plane over lines II-II', III-III', IV-IV' of FIG. 2.

FIG. 2 is a schematic view of a light illuminating unit according to an embodiment of the present invention, FIG. 3A is a view illustrating illuminance distribution on a plane over lines II-II', III-III', IV-IV' of FIG. 2, and FIG. 3B is a view illustrating light component distribution on a plane over lines II-II', III-III', IV-IV' of FIG. 2.

As illustrated in FIG. 2, non-polarized light containing UV radiation, emitted from a light source 201 is condensed by a light-condensing mirror 203 and reflected by a first reflective mirror 205 to be incident to a fly eye lens 207.

The light source 201 has is disposed at a predetermined inclination relative to the light-condensing mirror so that light emitted from the inclined light source 201 and reflected by the condensing mirror 203 has an anisotropic illuminance distribution and has a characteristic of partially polarized light in which a p-wave intensity and a s-wave intensity are different from each other due to an anisotropic structure.

The light is spread out by the fly eye lens 207 and then reflected by a second reflective mirror 209 to be incident to a collimator lens 208 for condensing the light. The light is condensed by the collimator lens 208 and the condensed light is incident to a polarizing device 211.

The light incident to the polarizing device 211 is partially polarized light having an anisotropic illuminance distribution.

The polarizing device 211 includes a quartz substrate 221 and a support 210 for supporting the quartz substrate 221. The quartz substrate 221 can be a single layer or a multi-layer stack.

For example, the polarizing device 211 may include four stacked quartz substrates 221. The partially polarized light is converted to polarized light by passing through the polarizing device 211.

The partially polarized light having different p-wave and s-wave intensities (e.g., the p-wave intensity is greater than the s-wave intensity) is incident onto the polarizing device 211 at a Brewster's angle B. While the partially polarized light passes through the quartz substrates 221 of the polarizing device 211, part of the s-wave is reflected off and part of the p-wave is transmitted, so that polarized light having a p-wave intensity significantly greater than the s-wave intensity is directed onto an alignment layer 213 formed on a substrate 215.

The Brewster's angle B is an angle at which the quartz substrate 221 is inclined with respect to a horizontal line perpendicular to the path of the light incident to the polarizing device 211.

In summary, as shown in FIG. 3A, non-polarized light radiated from the light source 201 and reflected by the condensing mirror 203 has an anisotropic illuminance characteristic because the light source 201 is inclined. After passing through an optical device including the first reflective mirror 205, the fly eye lens 207, the second reflective mirror 209, and the collimator lens 208, the light has anisotropic illuminance distribution. Further, the light that has passed through the optical device has an anisotropic distribution even after passing through the polarizing device 211.

The light after passing through the polarizing device 211 may be or may not have the same be the same the anisotropic distribution and properties as the light passing through the optical device.

As illustrated in FIG. 3B, the non-polarized light emitted from the light source 201 has anisotropic distribution because the light source 201 is inclined. Regarding the light component characteristics of light reflected by the condensing mirror 203, an s-wave intensity and a p-wave intensity are different from each other and thus the reflected light is partially polarized. The light maintains the partial polarization even after passing completely through the optical device. After passing through the optical device, the partially polarized light having a predetermined and non-zero polarization degree can be changed into polarized light having a desired polarization degree by passing the light through the polarizing device 211.

The polarization degree is a ratio of polarized light to non-polarized light in light.

Therefore, the polarization degree satisfies Equation 1 and Equation 2 below:

$$P = \frac{I_p}{I_u + I_p}, \quad \text{Equation 1}$$

$$P = \frac{I_p - I_s}{I_p + I_s} \quad \text{Equation 2}$$

In Equation 1, P is a polarization degree, $I_p$ is the intensity of the polarized light and $I_u$ is intensity of the non-polarized light.

In Equation 2, P is the polarization degree, Ip is the intensity of p-wave, and $I_s$ is the intensity of s-wave.

Therefore, when P of light is zero, the light is completely non-polarized light. On the other hand, when P of light is 1, the light is completely linear-polarized light.

Figure 4:
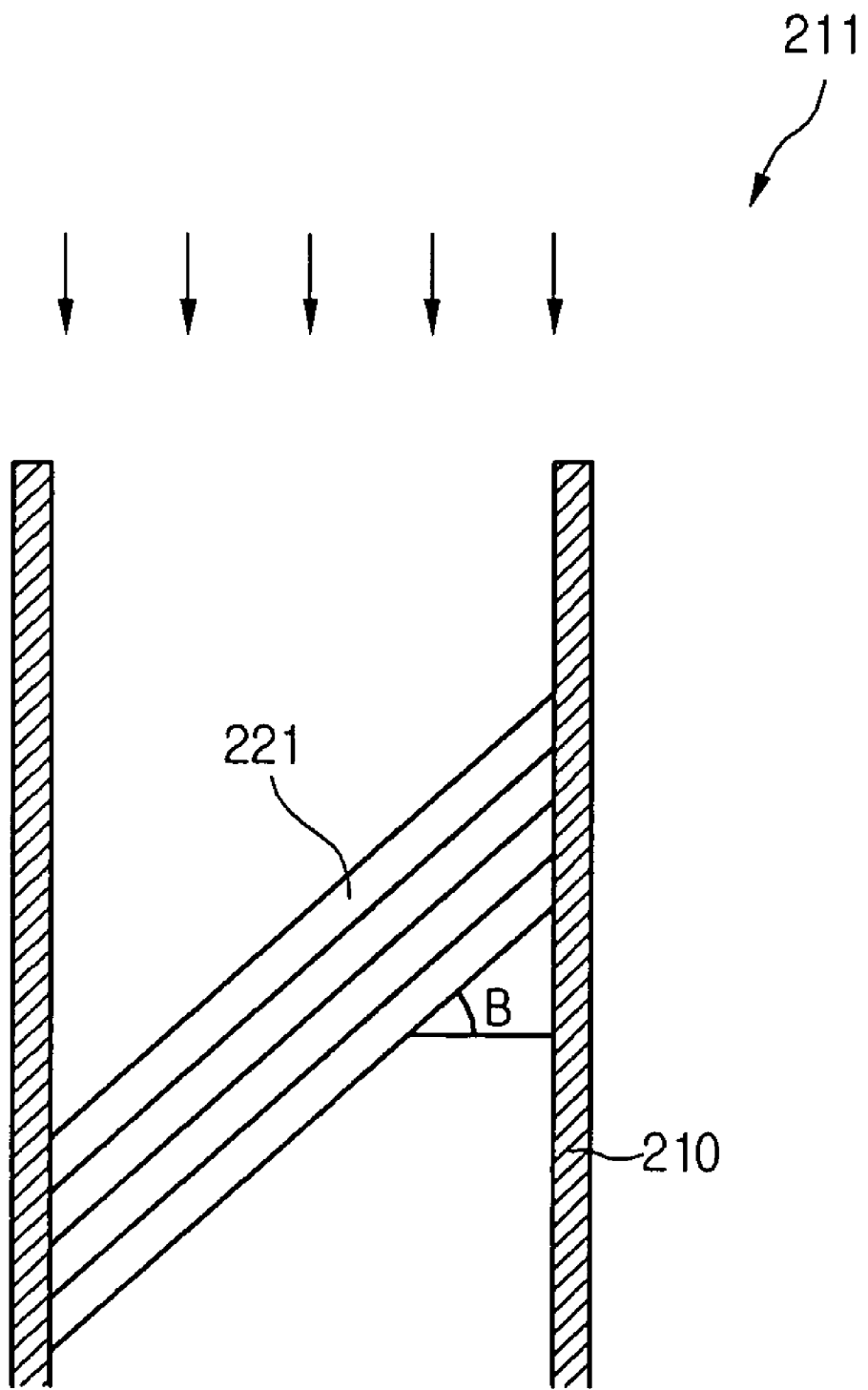
FIG. 4 is a cross-sectional view illustrating a portion of a polarizing device of a light illuminating unit according to the present invention.

FIG. 4 is a cross-sectional view illustrating a portion of a polarizing device of a light illuminating unit according to an embodiment of the present invention, FIG. 5A describes the relationships between polarization degree and a power efficiency and the number of quartz substrates for a related art light illuminating unit, and FIG. 5 describes the relationships between polarization degree and a power efficiency and the number of quartz substrates in a light illuminating unit according to the present invention.

As illustrated in FIG. 4, the polarizing device 211 of the light illuminating unit 200 may include four quartz substrates 221. The polarization degree of light emitted from the polarizing device 211 varies with the number of the quartz substrates 221 included in the polarizing device 211.

The light incident to the polarizing device 211 is partially polarized light having a p-wave intensity is greater than an s-wave intensity. In addition, when the light passes through the quartz substrate 221 of the polarizing device 211, the s-wave is reflected off and the p-wave is transmitted, enhancing the polarization efficiency of the polarizing device 211.

As shown in FIG. 5A, with the light illuminating unit of the related art, six quartz substrates 221 are stacked to obtain light having partial polarization of 0.5 when non-polarized light (light having a polarization degree of zero) is incident to the polarizing device 211.

Referring to FIG. 5B, when partially polarized light (for example, light having a polarization degree of 0.08) is incident to the polarizing device 211 four quartz substrates 221 may be stacked to obtain partially polarized light having polarization degree of 0.5.

Examination of a power efficiency of the polarizing device 211 shows that a power efficiency of the polarizing device 211 is 51% when non-polarized light is incident to the polarizing device 211 and partially polarized light having polarization degree of 0.5 is obtained, and that a power efficiency of the polarizing device 211 is 63% when partially polarized light having a polarization degree of 0.08 is incident to the polarizing device 211 and partially polarized light having polarization degree of 0.5 is obtained.

The power efficiency is 100% when the polarizing device 211 is not used, and the power efficiency decreases as the number of the quartz substrate 221 layers increases.

Therefore, according to the present invention, polarization efficiency and power efficiency may be improved by modifying disposition of the light source 201 in the light illuminating unit 200 and allowing partially polarized light having an anisotropic illuminance distribution to be incident to the polarizing device 211.

To allow partially polarized light to be incident to the polarizing device 211, the light source 201 may be inclined in an embodiment of the present invention, but light having an anisotropic illuminance distribution can be obtained and partially polarized light can be made incident to the polarizing device 211 by other means such as modifying the shape of the light source 201 or by introducing an anisotropic structure to optical components in the light path of the light emitted from the light source 201 to produce light having an anisotropic illuminance distribution.

Figure 6:
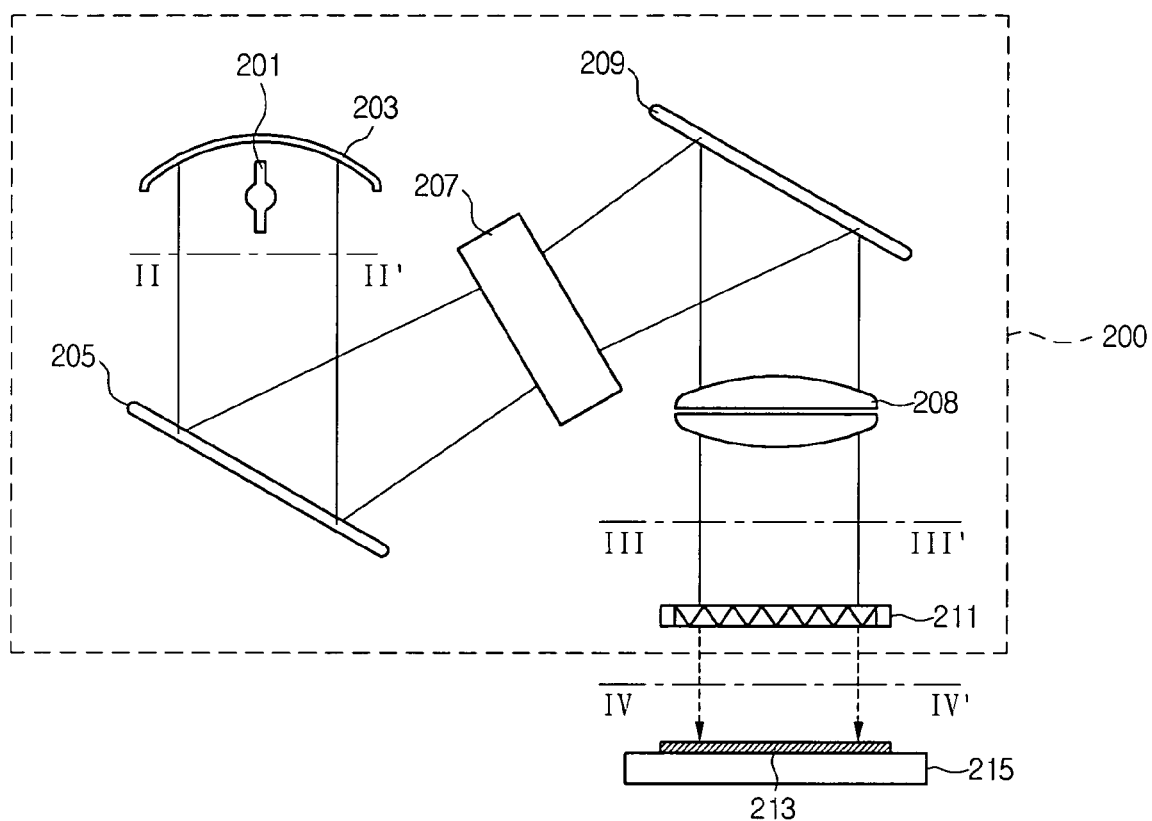
FIG. 6 is a schematic view of a light illuminating unit according to another embodiment of the present invention.
Figure 7A:
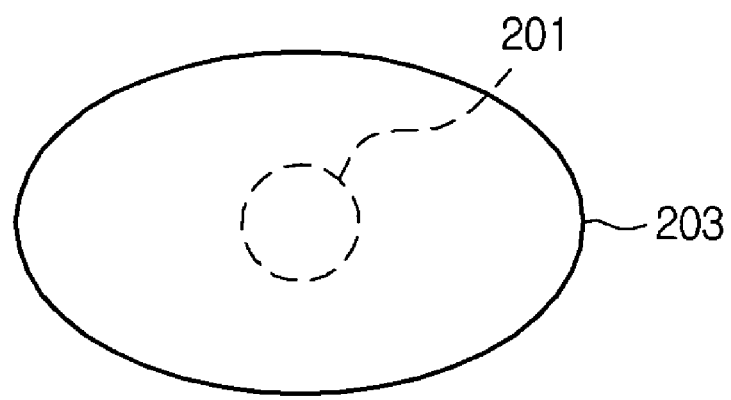
FIGS. 7A and 7B are views illustrating a condensing mirror of a light illuminating unit according to an embodiment of the present invention.
Figure 7B:
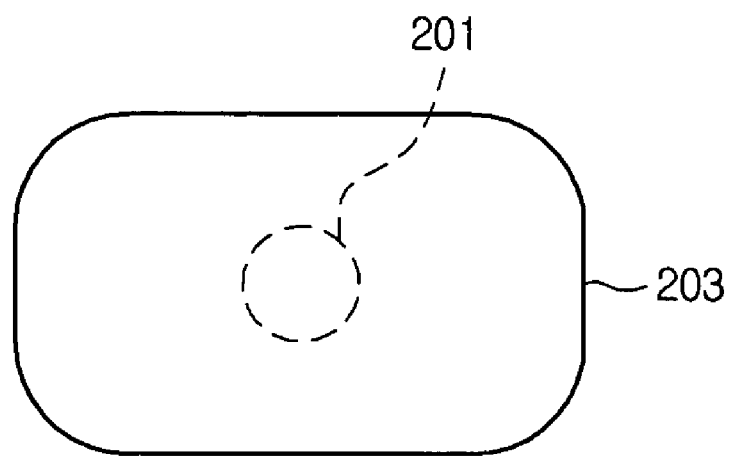
Figure 8A:
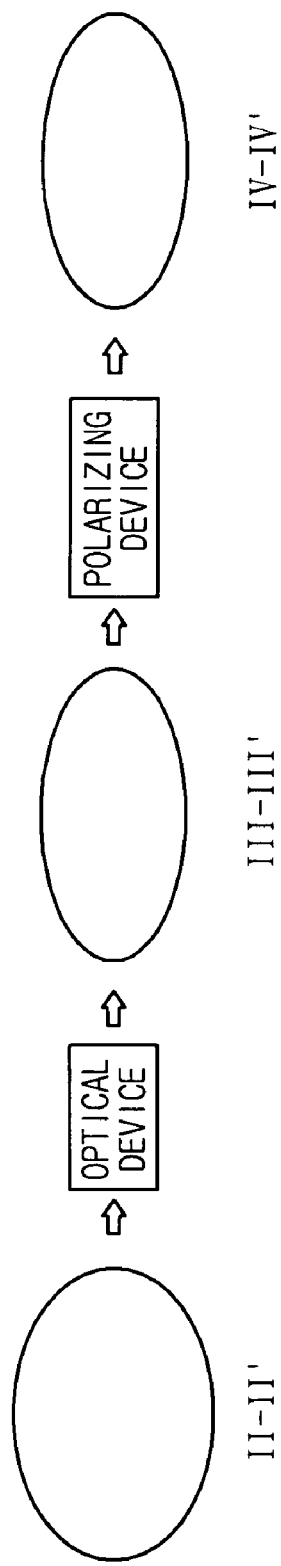
FIG. 8A is a view illustrating illuminance distribution on a plane over lines II-II', III-III', IV-IV' of FIG. 6.
Figure 8B:
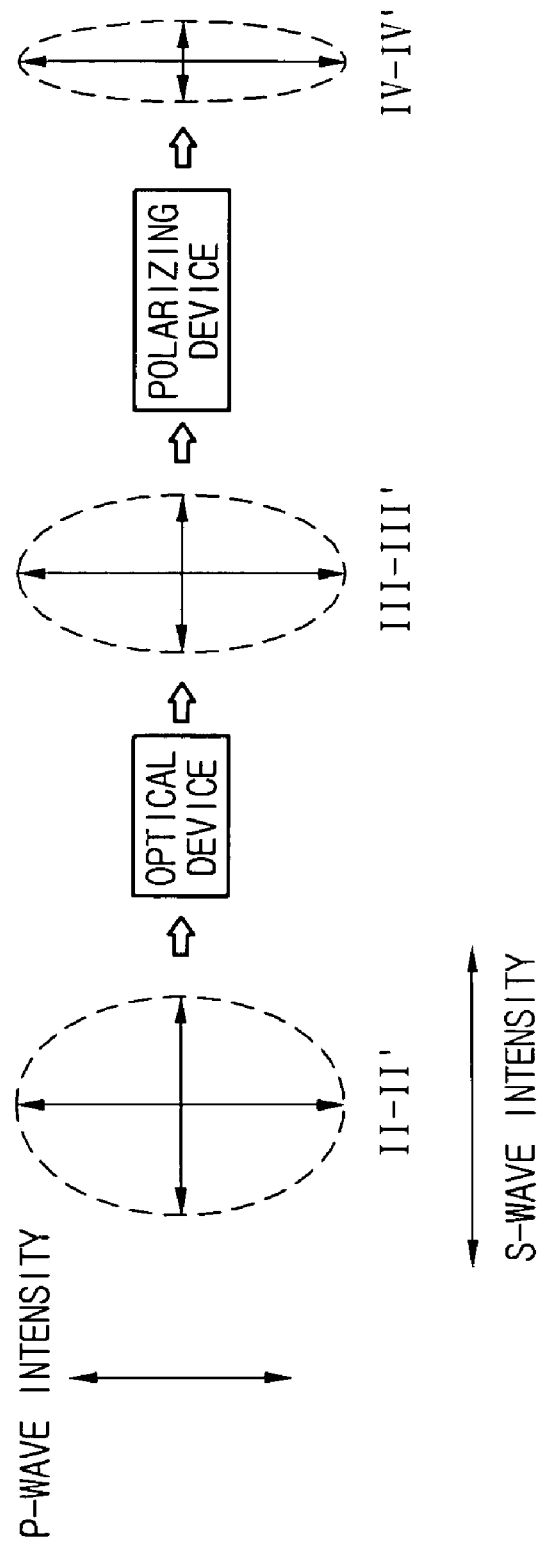
FIG. 8B is a view illustrating light component distribution on a plane over lines II-II', III-III', IV-IV' of FIG. 6.

FIG. 6 is a schematic view of a light illuminating unit according to another embodiment of the present invention, FIGS. 7A and 7B are views illustrating a condensing mirror of a light illuminating unit according to an embodiment of the present invention, FIG. 8A is a view illustrating illuminance distribution on a plane over lines II-II', III-III', IV-IV' of FIG. 6, and FIG. 8B is a view illustrating light component distribution in a plane along lines II-II', III-III', IV-IV' of FIG. 6.

Detailed descriptions of components of that are the same as those illustrated in FIG. 2 will be omitted.

Figure 9:
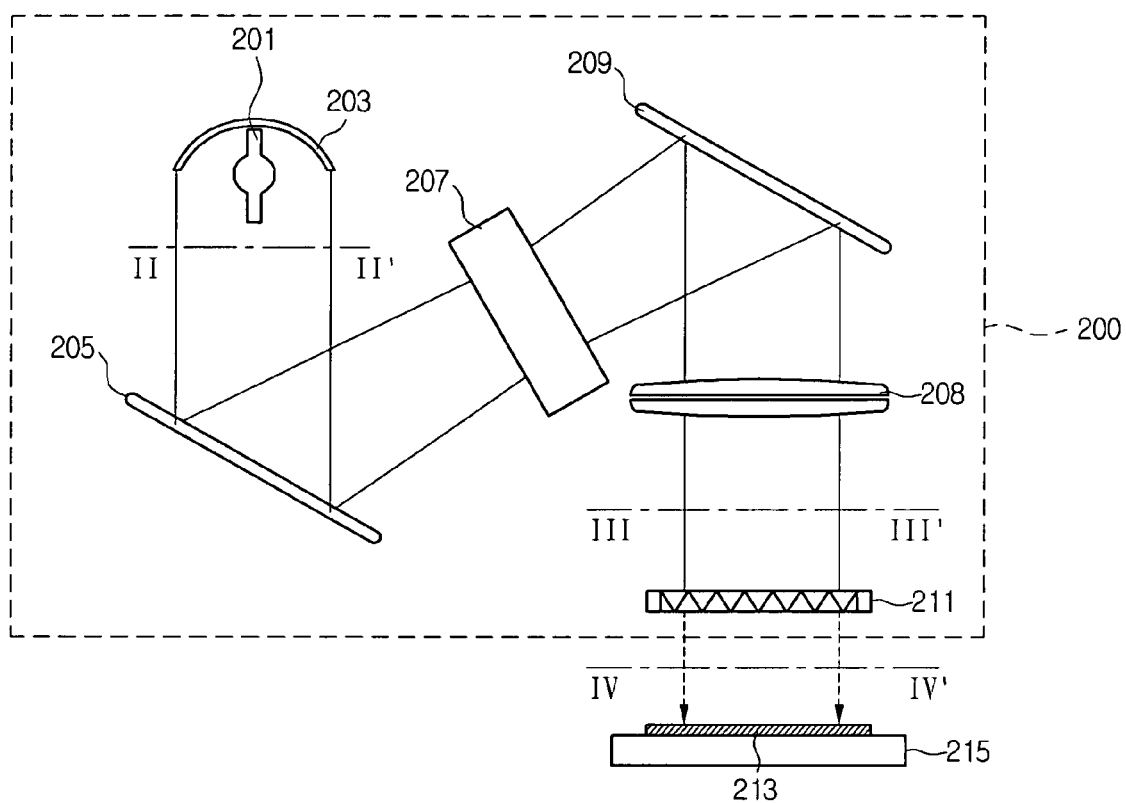
FIG. 9 is a schematic view of a light illuminating unit according to further another embodiment of the present invention.
Figure 10A:
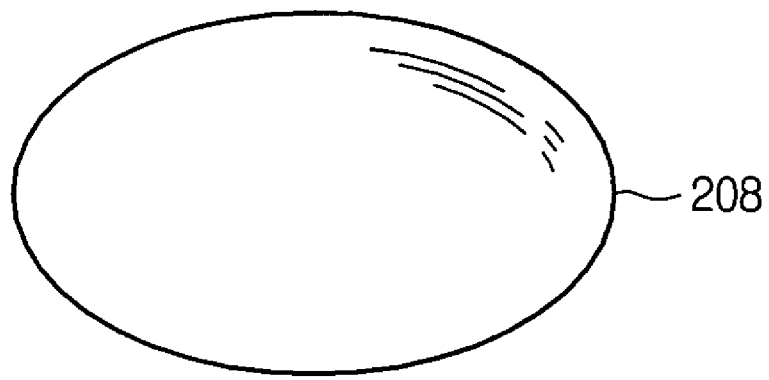
FIGS. 10A and 10B are views illustrating a collimating lens of a light illuminating unit according to an embodiment of the present invention.
Figure 10B:
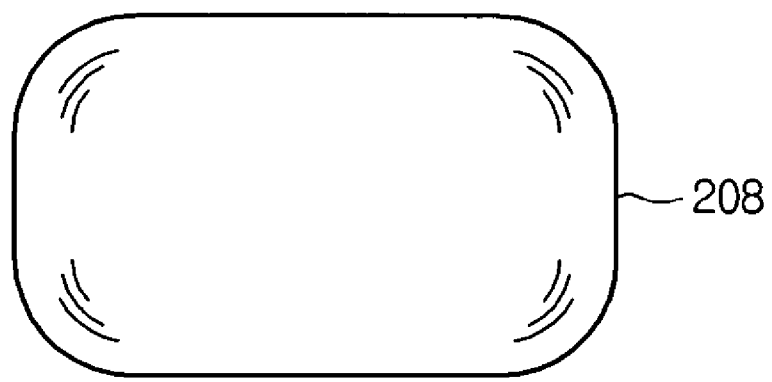

Referring to FIGS. 8 and 9, the light illuminating unit 200 includes a light source 201, a condensing mirror 203 having an anisotropic structure, for condensing non-polarized light emitted from the light source 201 in anisotropic distribution to a first reflective mirror 205.

A condensing mirror 203 having the anisotropic structure changes the illuminance distribution of light from isotropic light to anisotropic light. For example, the condensing mirror 203 may have an elliptical or rectangular plane structure.

Therefore, as shown in FIG. 8A, non-polarized light radiated from the light source 201 is changed into light having an anisotropic illuminance distribution upon reflection from the condensing mirror 203 having an elliptical or rectangular anisotropic structure. Subsequently, the light passes through an optical device including a first reflective mirror 205, a fly eye lens 207, a second reflective mirror 209, and a collimator lens 208. The light that has passed through the optical device has an anisotropic illuminance distribution, and is illuminated onto a substrate with the anisotropic distribution even after passing through a polarizing device.

The light after passing through the optical device may or may not have the same optical characteristics and illuminance distribution as the light that has passed through both the optical device and the polarizing device 211.

As illustrated in FIG. 8B, non-polarized light emitted from the light source is reflected by the condensing mirror 203. The reflected light is partially polarized light that includes an s-wave and a p-wave whose intensities are different. The reflected light maintains the partial polarization even after passing through the optical device. The partially polarized light having a non-zero, predetermined polarization degree, can be changed into polarized light having a desired polarization degree by passing the light through the polarizing device 211.

The partially polarized light after passing through the optical device may be or may not have the same polarizing degree and anisotropic illuminance distribution as the partially polarized light after passing through the optical device and the polarizing device 211.

Figure 11A:
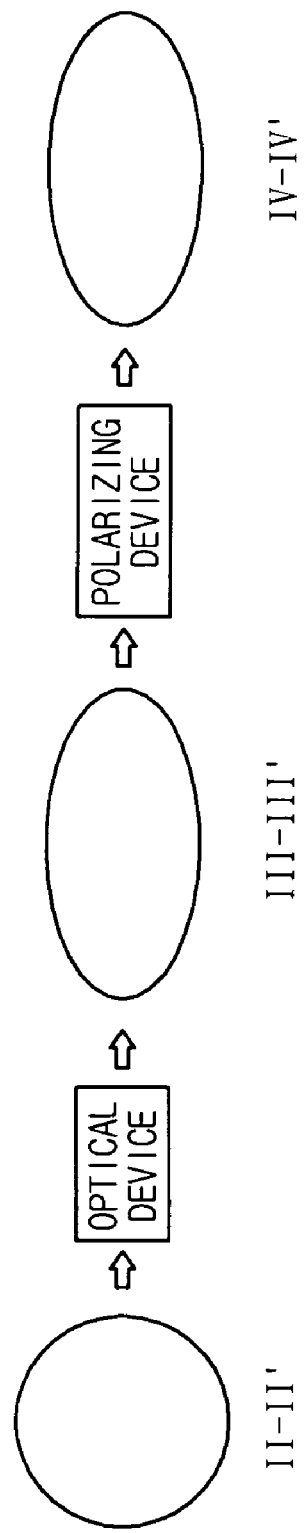
FIG. 11A is a view illustrating illuminance distribution on a plane over lines II-II', III-III', IV-IV' of FIG. 9.
Figure 11B:
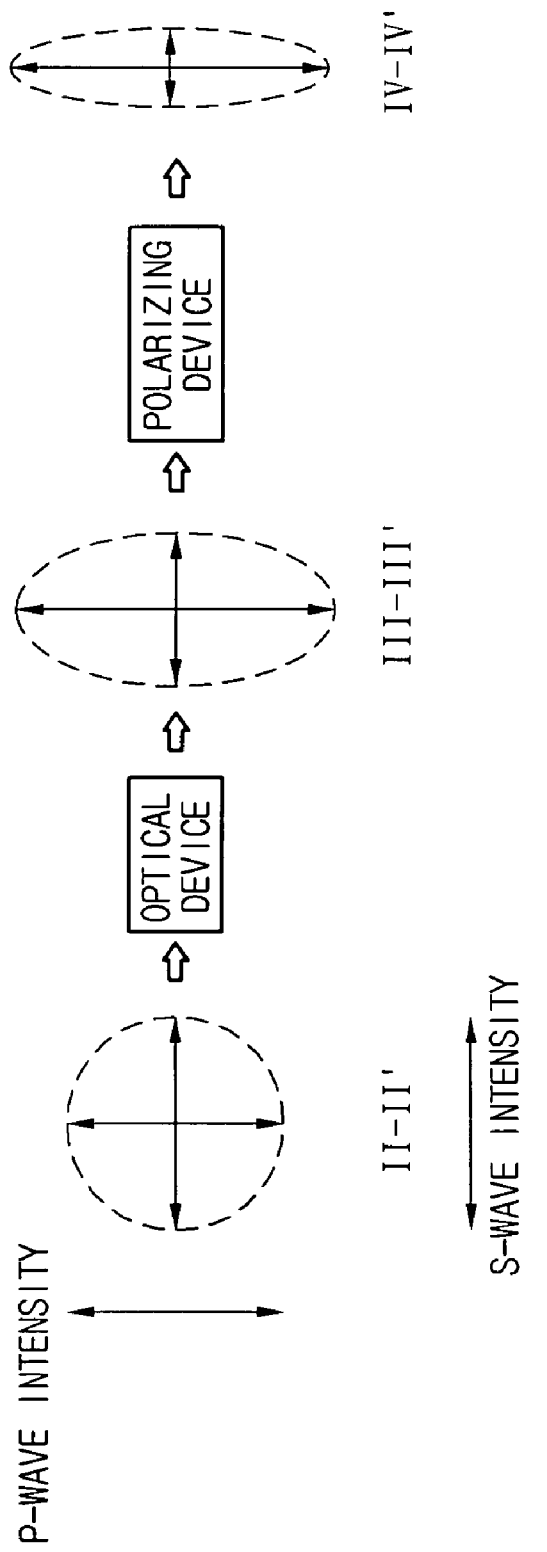
FIG. 11B is a view illustrating light component distribution on a plane over lines II-II', III-III', IV-IV' of FIG. 9.

FIG. 9 is a schematic view of a light illuminating unit according to still another embodiment of the present invention, FIGS. 12A and 12B are views illustrating a collimating lens of a light illuminating unit according to an embodiment of the present invention, FIG. 11A is a view illustrating illuminance distribution on a plane over lines II-II', III-III', IV-IV' of FIG. 9, and FIG. 11B is a view illustrating light component distribution on a plane over lines II-II', III-III', IV-IV' of FIG. 9.

Detailed descriptions of components that are the same as those of FIG. 2 will be omitted.

As illustrated in FIG. 9, to allow light partially polarized and having an anisotropic illuminance distribution to be incident to the polarizing device 211, a collimating lens 208 is formed to have an anisotropic structure.

Referring to FIGS. 12A and 12B, the collimating lens 208 having the anisotropic structure may have an elliptical or rectangular lens shape.

Light incident to the collimating lens 208 is non-polarized light having an isotropic illuminance distribution, and light emitted from the collimating lens 208 is partially polarized light.

Referring to FIGS. 13A and 13B, the partially polarized light emitted from the collimating lens 208 has an anisotropic illuminance distribution and is partially polarized having a p-wave intensity is greater than an s-wave intensity. While the partially polarized light passes through the polarizing device 211, a predetermined portion of the s-wave is reflected off and the p-wave is transmitted, so that a polarization degree of the light passing through the polarizing device 211 is further enhanced.

The light intensity and uniformity of illumination distribution of the partially polarized light decreases as the number of quartz substrates 221 through which the light passes increases.

Therefore, in an embodiment according to the present invention, the number of the quartz substrates 221 of the polarizing device 211 in the light illuminating unit 200 that induces polarization can be reduced, to improve the power efficiency of the light illuminating unit.

Figure 12:
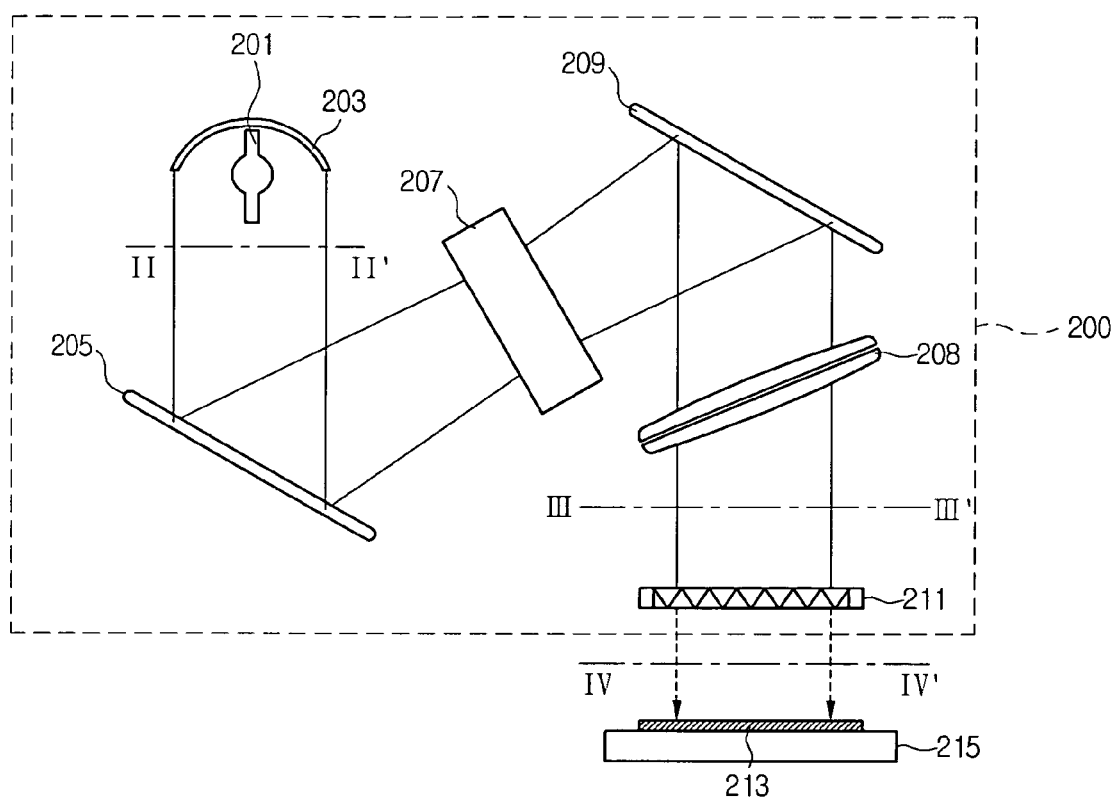
FIG. 12 is a schematic view of a light illuminating unit according to still another embodiment of the present invention.

FIG. 12 is a schematic view of a light illuminating unit according to still another embodiment of the present invention.

Descriptions of components illustrated in FIG. 12 that are the same as those of FIG. 2 will be omitted.

As illustrated in FIG. 12, light is incident to the collimating lens 208 that is disposed to be inclined with respect to an optical axis of incident light. The light incident on the collimating lens 208 is non-polarized light having isotropic illuminance distribution. The light emitted from the collimating lens 208 is partially polarized light having an anisotropic illuminance distribution.

Therefore, partially polarized light is incident to the polarizing device 211 of the light illuminating unit 200. The partially polarized light is converted into partially polarized light having a greater polarization degree by passing through the quartz substrates 221 of the polarizing device 211. By passing partially polarized light through the polarizing device 211, the number of the quartz substrates 221 of the polarizing device 211 that induces polarization can be reduced, and thus a power efficiency of the light illuminating unit can be improved.

Figure 13:
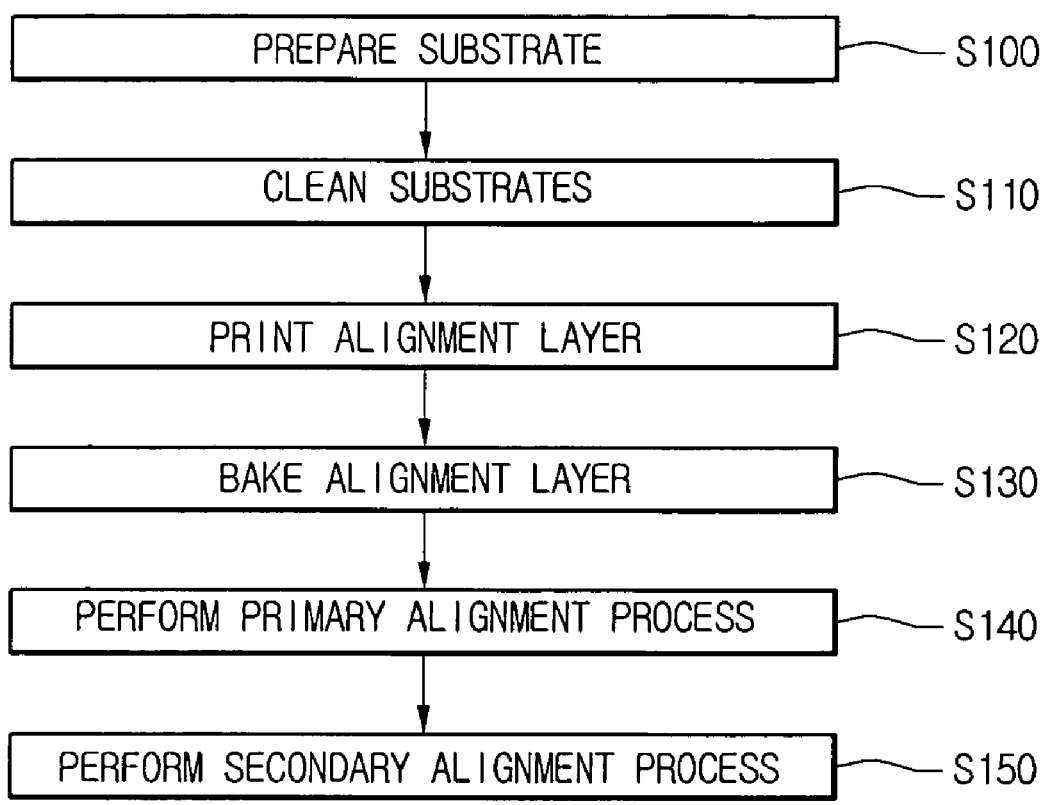
FIG. 13 is a flowchart illustrating a method of forming an alignment layer of an LCD according to the present invention.

FIG. 13 is a flowchart illustrating a method of forming an alignment layer of an LCD according to the present invention.

In operation S100, top and bottom substrates are prepared.

In operation S110, a cleaning process is performed to remove foreign particles from a substrate on which patterns are formed. In operation S120, polyimide (PI) that is a raw material solution of an alignment layer may be printed on the substrate by using an apparatus for printing alignment layer.

In operation S130, a solvent may be dried and hardened by heating the raw material solution to a high temperature.

In operation S140, a primary alignment process is performed in which grooves are formed in an alignment layer by rubbing a surface of the alignment layer in a first direction using a rubbing apparatus to from grooves in the alignment layer.

In operation S150, a secondary alignment process is performed on the alignment layer by using a light irradiation method.

During the primary alignment process a main chain or side chain of the alignment layer may become broken or a portion of the surface of the alignment layer may become thin producing defects in the alignment layer. Accordingly, rubbing defects occurring in the alignment layer after the primary alignment process can be removed by performing the secondary alignment process.

The secondary alignment process is performed by irradiating a polarized light onto the alignment layer having a predetermined polarization direction. The polarized light used in the secondary alignment process may have a polarization direction substantially the same as the first direction of the rubbing process. Alternatively, the polarized light has a polarization direction substantially perpendicular to the first direction of the rubbing process.

The direction of polarization of light illuminating the alignment is selected to be parallel or perpendicular to the first direction of rubbing during the primary alignment process depending on the properties of the alignment material. Some materials exhibit photo-alignment in a direction perpendicular to the direction of polarization of incident light, while other materials exhibit photo-alignment in a direction parallel to the direction of polarization of incident light. The polarization direction is selected so that the alignment direction produced by the polarized light is substantially the same as the rubbing direction of the primary A liquid crystal display device (LCD) according to the present invention includes a first substrate and a second substrate. The first substrate may include a black matrix, a color filter having sub color filters, a common electrode on the color filter. The second substrate may include a switching element comprising a thin film transistor (TFT) connected to a pixel electrode on a pixel region. A liquid crystal layer is disposed between the first substrate and the second substrate, and an alignment layer is formed on the uppermost layers of the at least one of the first substrate and the second substrate.

A method of fabricating the LCD includes preparing a first substrate and a second substrate, coating an alignment layer on the first substrate, preparing a light illuminating unit having an anisotropic structure to generate light having an anisotropic illuminance distribution, transmitting light having an anisotropic illuminance distribution from the light illuminating unit to a polarizing device to generate polarized light; irradiating polarized light from the polarizing device onto the alignment layer, and disposing a liquid crystal layer between the first and second substrates.

In a light illuminating unit according to the above-described embodiments, one or more of a light source, a condensing mirror, and an optical device are formed to have an anisotropic structure by forming the component in an anisotropic shape or by arranging the component relative to other components to allow light having an anisotropic illuminance distribution to be incident to a polarizing device. Accordingly, when the light incident to the polarizing device the illuminance distribution of the light has an anisotropic characteristic and the incident light is partially polarized. The present invention can be realized using at least one of the above-described embodiments.

For example, the arrangements and shapes of a light source and an optical device can be modified so that illuminance distribution of light can be made anisotropic prior to incidence on a polarizing device according to the present invention. A flat structure of the reflective mirror can be modified into a structure that can reflect light so that the reflected light has an anisotropic illuminance distribution.

As described above, after performing the rubbing process on the entire surface of the alignment layer in the LCD device, the light irradiation are performed on the entire surface of the rubbed alignment layer. Accordingly, light leakage may be prevented and the contrast ratio may be improved. As a result, during operation of the LCD device, a high quality image may be obtained, thereby enhancing the reliability of products.

Figure 14:
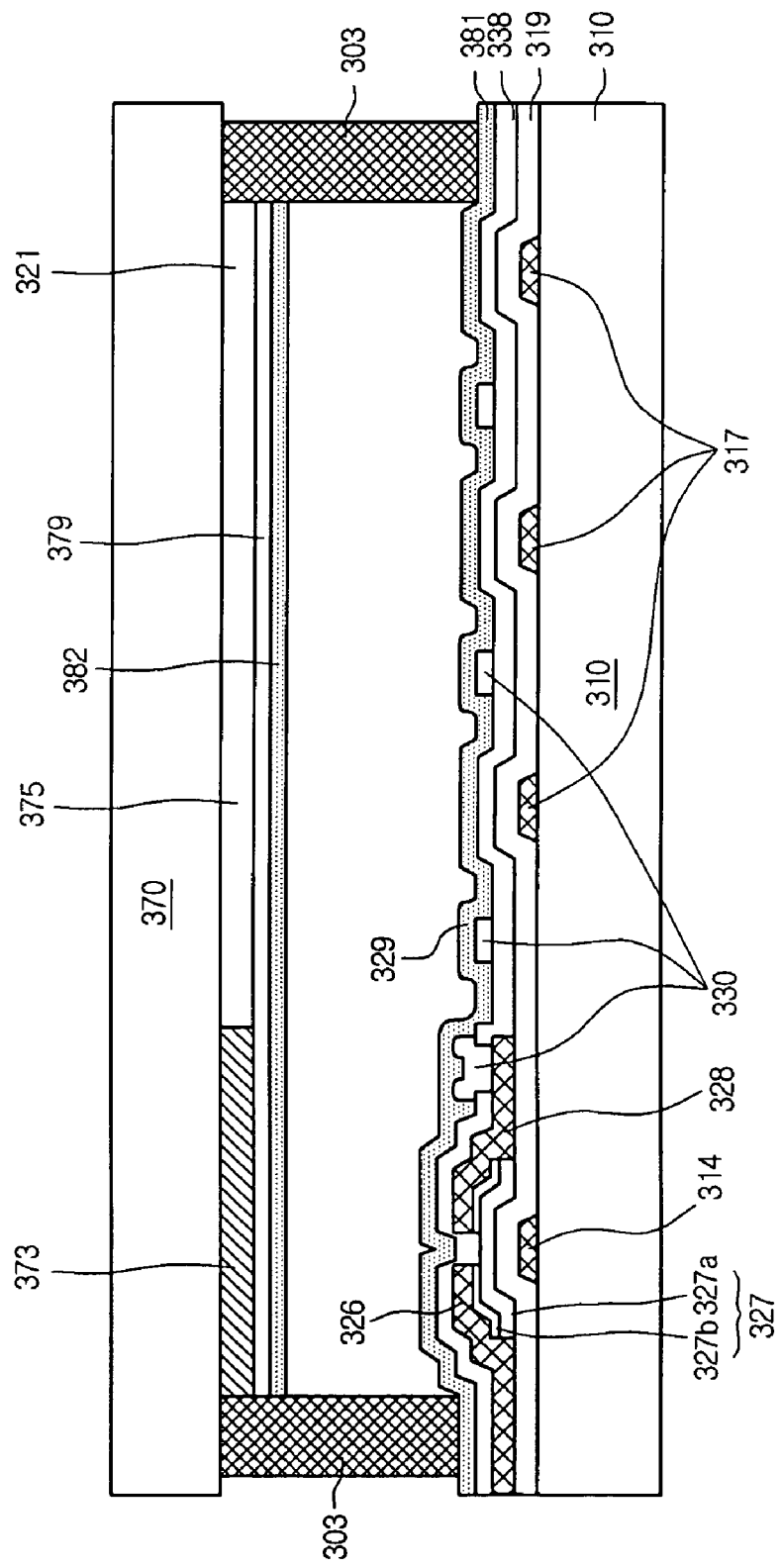
FIG. 14 is a sectional view illustrating an in-plane switching mode LCD device according to the present invention.

FIG. 14 is a view illustrating an in-plane switching mode LCD device according to the present invention.

Referring to FIG. 14, a metal having a low specific resistance to reduce or prevent signal delay is deposited on a TFT array substrate 310. The deposited low resistance metal is patterned using photolithography to form a gate line and a gate electrode 314 of a TFT that branches from the gate line.

For example, metals including Cu, Al, AlNd, Mo, Cr, Ti, Ta, and MoW may be used to form the gate lines and gate electrodes.

A common line parallel to the gate line, and a plurality of common electrodes 317 branching from the common line are simultaneously formed with the gate line and gate electrode 314.

An inorganic insulating material such as SiNx and SiOx is then deposited on an entire surface of a TFT array substrate 310 including the gate line using plasma enhanced chemical vapor deposition (PECVD) to form a gate insulating layer 319.

Next material such as amorphous silicon is deposited on the gate insulating layer 319 and selectively patterned to form a semiconductor layer 327 in an island shape on a portion of the gate insulating layer 319 located over the gate electrode 314.

The semiconductor layer 327 may include an ohmic contact layer 327b on an amorphous silicon layer 327a. The ohmic contact layer 327b may be formed by implanting impurity ions in a portion of the amorphous silicon 327a.

A layer of a metal such as Cr, Al, Cu, Mo, Ti, Ta, MoW, or an Al alloy is deposited on an entire surface of the gate insulating layer 319 and patterned using photolithography to form a data line perpendicularly crossing the gate line to define a pixel region. Simultaneously, a source electrode 326 and a drain electrode 328 are formed at respective ends of the semiconductor layer 327.

Next, a silicon nitride layer or an organic insulating layer of a material such as benzocyclobutene (BCB) is formed on an entire surface of the array substrate 310 including the date line to form a passivation layer 338. A contact hole is formed in the drain electrode 328.

A transparent conductive layer is then deposited on the entire surface of the array substrate 310 using materials such as indium tin oxide (ITO) or indium zinc oxide (IZO) and patterned to form a plurality of pixel electrodes 330. The pixel electrodes 330 are connected to the drain electrodes 328. The pixel electrodes are parallel to the data lines and are located between the common electrodes 317. In particularly, the pixel electrodes 330 are alternately arranged with the common electrodes 317.

Alternately, the pixel electrode 330 may be formed of metal and may be simultaneously formed with the data line when the data line before the passivation layer 338 is formed.

The array substrate including the pixel electrode 330 includes an alignment layer formed as described hereinafter.

First, an alignment layer material is formed on an entire surface of the array substrate 310. A polyimide resin having excellent heat resistance and excellent affinity with respect to liquid crystal is printed on the substrate and dried to form a first alignment layer 381. The first alignment layer 381 is the primarily aligned using a rubbing process.

Besides polyimide resin, the alignment layer may be formed of a material selected from the group consisting of a polyamic acid, polyethyleneimine, polyvinyl alcohol, polyamide, polyethylene, polyphenylenephthalamide, polyester, polyurethanes, and polymethylmethacrylate or other polymer having a bond selectively cut off when an ultraviolet is illuminated thereto. These materials have a property such that an alignment layer of these materials is photo-aligned in a direction perpendicular to a polarization direction of incident light.

Alternatively, the alignment layer may be formed of polystyrene. Polystyrene exhibits photo-alignment in a direction coinciding with the polarization direction of incident light.

The primary aligning of the first alignment layer is performed using a rubbing method of aligning a direction by rubbing the first alignment layer 381 in a predetermined direction using a rubbing cloth 333 formed by winding velvet, rayon, and nylon.

After the primary alignment of the alignment layer 381, the array substrate 310 a secondary alignment is performed by illuminating light on the first alignment layer 381.

The light can be partially polarized light, and may have a polarization degree of 0.5 or more.

Here, the polarization degree means a ratio of polarized light to non-polarized light in the non-polarized light illuminated onto the first alignment layer.

The, light can be illuminated onto the alignment layer using an inclined illuminating method or a perpendicular illuminating method. That is the light may be directed to be incident substantially perpendicular to the alignment layer and the substrate, or the light may be directed to be incident at an angle to a perpendicular to the substrate.

The light illuminating unit may be a surface illuminating unit for illuminating light onto an entire surface of a substrate. Alternatively a scan type illuminating unit which illuminating light while moving across the surface of a substrate may be used.

By performing a secondary alignment on the first alignment layer 381 on which a primary alignment has been performed, by illuminating partially polarized light on the first alignment layer 381 using an illumination unit according to the present invention, light illumination efficiency is maximized while a height difference portion in the vicinity of an electrode portion of a substrate are substantially uniformly aligned.

A black matrix 373 is formed on a color filter substrate 370 using metal having high reflectivity such as Cr and CrOx, or using a black resin to prevent light leakage at portions of the LCD device in which the orientation of the liquid crystal cannot be controlled including at portions occupied by gate lines, data lines, and TFTs.

A polyimide material having excellent affinity with respect to liquid crystal and having a photosensitivity property is printed on the overcoat layer 379 to form a second alignment layer 382. The second alignment layer 382 is then aligned using the above-described primary and secondary alignment process.

Subsequently, after a column spacer is formed on one of the array substrate 310 and the color filter substrate 370, seal patterns 303 are formed along edges of the array substrate 310 or the color filter substrate 370. A liquid crystal (LC) panel is completed by attaching the array substrate 310 to the color filter substrate 370.

FIG. 15 is a flowchart illustrating a method for manufacturing an in-plane switching mode LCD device according to the present invention.

First, TFTs, which are driving devices, and a color filter layer are formed on a lower substrate (the array substrate) and an upper substrate (the color filter substrate), respectively, using an array process and a color filter process as illustrated in FIG. 14 (S201 and S202).

The lower substrate includes a plurality of gate lines arranged with a predetermined interval in one direction, a plurality of data lines arranged with a predetermined interval in a direction perpendicular to the direction of the gate lines, a plurality of pixel electrodes arranged in a matrix at respective pixel regions defined by intersections of the gate lines and the data lines, and a plurality of TFTs that switched in response to signals of the gate lines to deliver signals of the data lines to respective pixel electrodes.

The upper substrate may include: a black matrix layer for blocking light from portions excluding the pixel regions; a color filter layer including red (R), green (G), and blue (B) color filters for reproducing colors; and common electrodes for realizing an image.

An LCD device manufactured according to the present invention may be a vertical electric field type twisted nematic (TN) mode LCD device or a vertical alignment (VA) mode LCD device. Alternatively, the LCD device may be an in-plane switching (IPS) mode LCD device or a fringe field switching (FFS) mode LCD device having a common electrode can be formed on the lower substrate. The present invention may be applied to LCD devices using various modes of operation.

Additionally, although the process for manufacturing the upper substrate is called a color filter process, the color filter process and the black matrix process may be simultaneously performed together with the array process for forming the lower substrate depending on the type or mode of the LCD device and the corresponding manufacturing process.

The array process and the color filter process are collectively performed on a large-sized glass substrate on which a plurality of panel regions is formed.

First, a plurality of gate lines and data lines arranged on the lower substrate and defining pixel regions are formed using the array process (S201). TFTs to be used as driving devices are connected to the gate lines and the data lines are formed in respective pixel regions.

A pixel electrode connected to each TFT for driving an liquid crystal (LC) layer of a pixel region when a signal is applied to the pixel electrode via the TFT is formed using the array process.

The upper substrate includes a color filter layer including R, G, and B color filters formed using the color filter process (S202).

Subsequently, an alignment layer is coated on the lower substrate 100 on which the TFTs are formed and on the upper substrate 110 on which the color filter layer is formed. The alignment layer is primarily aligned using a primary alignment process (S203).

The alignment layer is further aligned using a secondary alignment process by irradiating partially polarized light having a polarization degree of 0.5 or more onto the primarily aligned alignment layer (S204).

In an IPS mode LCD device having both common electrodes and pixel electrodes are formed on one of an upper substrate and a lower substrate, the common electrodes, the pixel electrodes, gate lines, and data liens are formed in strip patterns or zigzag patterns, producing height differences. Alignment using only a rubbing operation may be particularly ineffective in regions of the device having height differences resulting in light leakage which reduces the intensity or contrast ratio of black image areas rendered by the LCD device. The present invention improves black "brightness" by irradiating partially polarized light onto the rubbed substrate to increase the uniformity of alignment to eliminate or reduce light leakage.

Spacers are dispensed or alternatively a patterned spacer may be formed on the upper substrate or the lower substrate, and seal patterns are formed along an outer edge to attach the upper substrate to the lower substrate (S205).

The upper substrate and the lower substrate may be positioned facing each other and are bonded each other in an order illustrated in a block A of FIG. 15.

Next, after the two substrates are completely attached to each other, liquid crystal is injected between the two substrates through an injection port, and the injection port is sealed, to complete the forming of an LC panel (S207).

Alternatively, an LC panel can be manufactured using an LC dropping method illustrated in a block B of FIG. 15 as well as by using the LC injecting method described and illustrated in the block A. Using the dropping method, LC is dropped on a LC panel region of the lower substrate (S208) prior to bonding the substrate and the upper and lower substrates are then bonded together (S209).

A plurality of LC panels each including an LC layer is formed are formed on a large sized glass substrate (the lower substrate and the upper substrate) using the above-described process. The glass substrate is processed and cut into a plurality of LC panels. After cutting into individual panels, the LCD manufacturing process is completed by testing each LC panel.

An alignment layer 321 is formed on the array substrate (or the lower substrate) on which the TFTs are formed and the color filter substrate (or the upper substrate). Hereinafter, both the TFT array substrate (or the lower substrate) and the color filter substrate (or the upper substrate) are referred to as a substrate 320.

The method for forming the alignment layer 321 may include spinning, dipping, roller coating, slit coating, and inkjet printing.

The alignment layer can be formed of at least one material, besides the above described polyimide resin selected from the group consisting of a polyamic acid, polyethyleneimine, polyvinyl alcohol, polyamide, polyethylene, polyphenylenephthalamide, polyester, polyurethanes, and polymethylmethacrylate. These materials include polymers having a bond selectively cut off when an ultraviolet is illuminated thereto, and exhibit a property wherein an alignment layer of the materials is aligned in a direction perpendicular to a polarization direction.

When the alignment layer is formed of polystylene, the alignment layer is aligned in a direction coinciding with the polarization direction.

A rubbing process as the primary alignment process is performed on the substrate on which the alignment layer is formed.

The rubbing process includes vaporizing a solvent at a temperature range of 60-80° C., curing the alignment layer at a temperature range of 80-200° C., and rubbing the alignment layer in a predetermined direction using a rubbing cloth of a wound material such as velvet to form an alignment direction for the LC.

At this point, the substrate is put on a stage and transferred at a constant speed by a transport such as a roller carrying unit.

After that, the primarily aligned alignment layer 321 is transferred to a light illuminating unit 350 for performing a secondary alignment process.

The second alignment process is performed by using photo-alignment on the rubbed alignment layer using linearly polarized light or partially polarized light.

The light may be illuminated onto the alignment layer using an inclined illuminating method or a perpendicularly illuminating method.

The light illuminating unit can be an entire surface illuminating unit for illuminating light onto an entire surface of a substrate or a scan type illuminating unit for illuminating light while scanning a substrate.

The details of the light illuminating unit for generating partially polarized light have been already described in detail. In brief, the light illuminating unit may include a light source, a condensing mirror, and an optical device and includes an anisotropic structure to allow light with an anisotropic illuminance distribution to be incident to a polarizing device.

Accordingly light from a light illuminating unit according to the present invention is incident to the polarizing device including a quartz substrate and is output as partially polarized light having a polarization degree of 0.5 or more.

The alignment layer can be a side chain alignment type alignment layer or a main chain alignment type alignment layer. In the side chain alignment type alignment layer, bonds of side chains are cut or arranged by a rubbing cloth or partially polarized light, so that a free-tilt angle of LC is determined in one direction. On the other hand, in the main chain alignment type alignment layer, bonds of isotropically formed main chains are cut in one direction by a rubbing cloth or partially polarized light, so that LC is aligned in an arrangement direction of remaining main chains and thus a free-tilt angle is determined. Hereinafter, description will be made using the side chain alignment type alignment layer.

The substrate is put on a stage and transferred at a constant speed by a transport system such as a roller carrying unit.

FIGS. 16 to 18 are conceptual views illustrating a structure of a side chain alignment type alignment layer aligned by an alignment layer system according to the present invention.

Figure 16A:
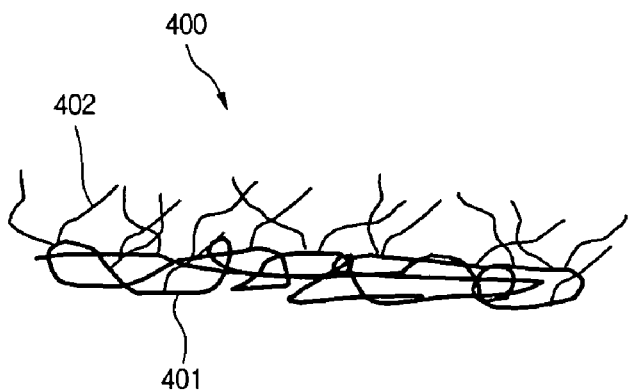
FIGS. 16, 17, and 18 are conceptual views illustrating a structure of a side chain alignment type alignment layer aligned by an alignment layer system according to the present invention.
Figure 16B:
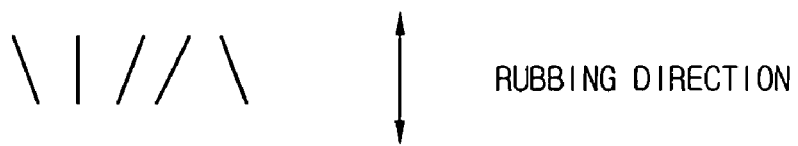

FIG. 16A is a view illustrating a lateral structure of a rubbed alignment layer, and FIG. 16B is a plan view illustrating a side chain distribution of a rubbed alignment layer.

Figure 17A:
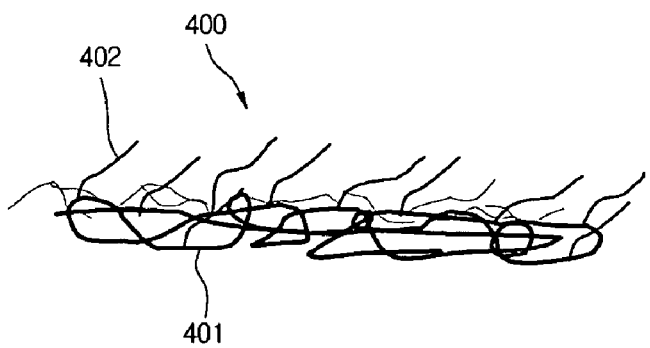
Figure 17B:
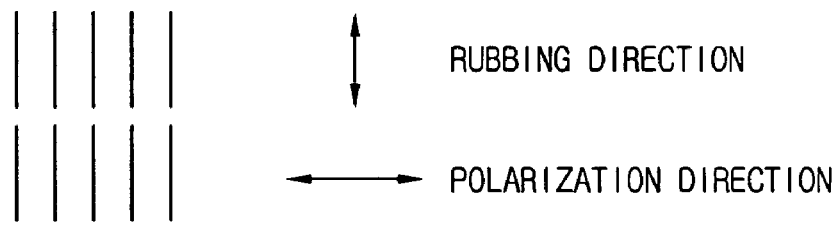

FIG. 17A is a view illustrating a lateral structure of light-processed alignment layer in the alignment layer of FIG. 16, and FIG. 17B is a view illustrating a side chain distribution of light-processed alignment layer.

Figure 18A:
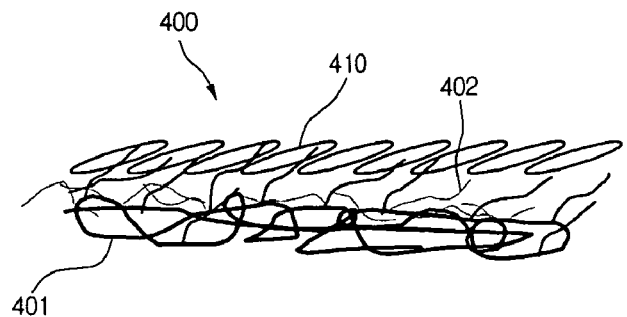
Figure 18B:
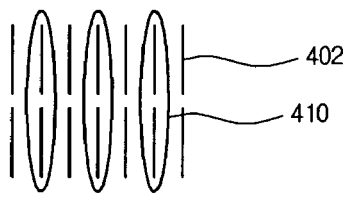

FIG. 18A is a side view illustrating alignment of LC by an alignment layer according to the present invention, and FIG. 18B is a plan view illustrating alignment of LC on an alignment layer.

Referring to FIGS. 16A and 16B, a rubbed alignment layer 400 is arranged in one direction by a side chain 402 coupled to a main chain 401. Side chains 402 are not uniformly aligned to one direction in the alignment layer 400 on which a rubbing operation has not been properly performed.

Therefore, referring to FIGS. 17A and 17B, when partially polarized light having a polarization degree of 0.5 or more is illuminated onto the alignment layer 400 which has been rubbed in a rubbing direction, bonding structures of the side chains 402 in the same direction as the polarization direction are cut, so that the side chains 402 determining the alignment of (liquid crystal) LC are uniformly aligned. The polarization direction of the light is perpendicular or substantially perpendicular to the rubbing direction.

Therefore, referring to FIGS. 18A and 18B, LC molecules 410 are uniformly aligned to one direction along arrangement of the side chains 402 by the side chain alignment type alignment layer 400 and have a predetermined free-tilt angle.

Figure 19:
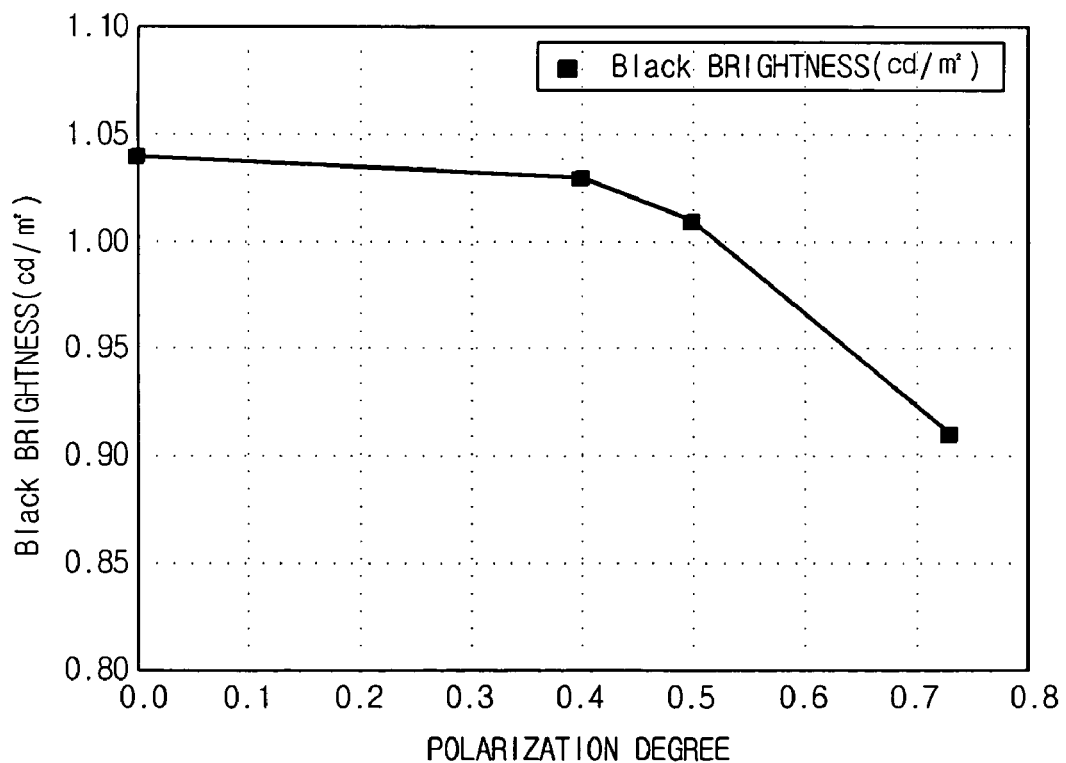
FIG. 19 is a graph illustrating black brightness versus polarization degree in an alignment layer forming process of an LCD device according to the present invention.

FIG. 19 is a graph illustrating black brightness versus polarization degree in an alignment layer forming process of an LCD device according to the present invention, and FIG. 20 is a microscope photo of an in-plane switching mode LCD device illustrating improvement in black brightness depending on a polarization degree.

At this point, an experiment has been performed under condition that the intensity of light illuminated onto an entire alignment layer is 0.5 w/cm2 using an IPS mode LCD device having both pixel electrodes and common electrodes formed in pixel regions of one substrate.

Referring to FIG. 19, black brightness of the IPS mode LCD device has been examined depending on a polarization degree of 0-0.7.

The black brightness means the intensity of light obtained by measuring light transmitted through an LCD device operating in normally black mode when a voltage is not to the LC panel. A low value of black brightness allows a high display quality.

As may be appreciated by referring to FIG. 19, when the polarization degree of light used in the secondary alignment increases to 0.5 or more black brightness improves substantially.

Additionally, as may be appreciated by referring to FIG. 20, light leakage for an IPS mode LCD device is significantly reduced for polarization degrees of 0.5 or 0.7 compared to the case in which an alignment layer is prepared using a rubbing operation without employing a secondary alignment using partially polarized light.

That is, when only a rubbing operation as a primary alignment process is performed on a substrate, the rubbing cloth does not reach a portions of an alignment layer at a height differences in the vicinity of an electrode having a height difference of 0.1 μm or more, so that alignment is not properly performed resulting in non uniformities in the alignment layer. Further, in areas of the alignment layer rubbed by a rubbing cloth disturbed after passing across a height difference, additional non-uniformities may be produced in the alignment layer. The non-uniformities in the alignment layer result in light leakage. On the other hand, when a secondary alignment process is performed by illuminating partially polarized light having a polarization degree of 0.5 or more on an alignment layer primarily aligned using the rubbing operation, the portion of the alignment layer at the height difference portion in the neighborhood of the electrode portion is uniformly aligned and light leakage may be reduced or eliminated.

Embodiments of the present invention may improves a characteristic of a produce by performing a rubbing operation on an entire surface of an alignment layer of an LCD device and illuminating partially polarized light on the rubbed alignment layer to reduce or prevent light leakage, and enhancing a color constant ratio to realize high image quality.

The present invention can improve polarization efficiency and power efficiency by modifying a light source's arrangement in a light illuminating unit and allow partially polarized light having an anisotropic illuminance distribution to be incident to a polarizing device.

In addition the invention may be practiced by modifying only the structures of a lens, a condensing mirror, and an optical device into anisotropic structures without replacing the entirety a related art light illuminating unit, relieving the burden of replacing related art equipment.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method of fabricating a liquid crystal display device comprising:
    coating an alignment layer on a substrate;
    rubbing the alignment layer along a first direction;
    preparing a light illuminating unit having an anisotropic structure to generate light having an anisotropic illuminance distribution;
    transmitting light having an anisotropic illuminance distribution from the light illuminating unit to a polarizing device to generate polarized light; and
    irradiating polarized light from the polarizing device onto the alignment layer,
    wherein the light illuminating unit includes a light source generating a light, and an optical device providing the generated light to the polarizing device,
    wherein the optical device comprises a condensing mirror condensing the generated light, a first reflective mirror reflecting the condensed light, a fly eye lens spreading the reflected light, a second reflective mirror re-reflecting the spreaded light, and a collimator lens condensing the re-reflecting light,
    wherein the light source is disposed at a inclination relative to the condensing mirror or the collimating lens is disposed to be inclined with respect to an optical axis of an incident light,
    wherein the polarized light has a polarization direction substantially the same as the first direction,
    wherein the light from the light source is partially polarized by the optical device, the partially polarized light has an anisotropic illuminance distribution by the inclination of the light source,
    wherein the partially polarized light is supplied to the polarizing device.

2. The method according to claim 1, wherein the polarized light has a polarization direction substantially perpendicular to the first direction.

3. A light illuminating unit comprising:
    a light generator to emit light having an anisotropic illuminance distribution; and a polarizing device to receive light from the light generator, wherein the light generator includes a light source and an optical device to process light from the light generator and provide to the polarizing device, wherein the optical device comprises a condensing mirror condensing the light from the light source, a first reflective mirror reflecting the condensed light, a fly eye lens spreading the reflected light, a second reflective mirror re-reflecting the spreaded light, and a collimar lens condensing the re-reflecting light, wherein the light from the light source is partially polarized by the optical device, the partially polarized light has an anisotropic illuminance distribution by an inclination of the light source, and wherein the partially polarized light is supplied to the polarizing device.

4. The light illuminating unit according to claim 3, wherein the light generator includes:
    a light source; and
    a condensing mirror to condense light from the light source, wherein the condensed light has an anisotropic illuminance distribution.

5. The light illuminating unit according to claim 3, wherein the light source has an anisotropic structure to emit light having an anisotropic illuminance distribution.

6. The light illuminating unit according to claim 4, wherein the condensing mirror is shaped to condensed light to have an anisotropic illuminance distribution.

7. The light illuminating unit according to claim 6, wherein the condensing mirror has an elliptical plane structure.

8. The light illuminating unit according to claim 6, wherein the condensing mirror has a rectangular plane structure.

9. The light illuminating unit according to claim 3, wherein the light source disposed at a predetermined inclination relative to the condensing mirror so that the condensed light has an anisotropic illuminance distribution.

10. The light illuminating unit according to claim 3, wherein the condensing mirror is shaped to condensed light to have an anisotropic illuminance distribution.

11. The light illuminating unit according to claim 3, wherein the optical device includes a mirror wherein light reflected by the mirror has an anisotropic illuminance distribution.

12. The light illuminating unit according to claim 3, wherein light collimated by the collimating lens has an anisotropic illuminance distribution.

13. The light illuminating unit according to claim 3, wherein the collimating lens has an elliptical plane structure.

14. The light illuminating unit according to claim 3, wherein the collimating lens has a rectangular plane structure.

15. The light illuminating unit according to claim 3, wherein the collimating lens is to transmit a p-wave having a predetermined intensity and a s-wave having a different predetermined intensity contained in incident light in an anisotropic manner.

16. The light illuminating unit according to claim 3, wherein the collimating lens of the optical device is disposed to have a predetermined inclination with respect to an optical axis of incident light to transmit incident light having an isotropic illuminance distribution as light having an anisotropic illuminance distribution.

17. The light illuminating unit according to claim 3, wherein the polarizing device comprises a quartz substrate formed of at least one layer of quartz.

18. A method of fabricating an LCD (liquid crystal display device), comprising:
preparing a first substrate and a second substrate;
coating a first alignment layer on an alignment substrate selected from one of the first substrate and the second substrate;
rubbing the first alignment layer along a first direction;
transmitting light having an anisotropic illuminance distribution from a light illuminating unit to a polarizing device to generate polarized light;
irradiating polarized light from the polarizing device onto the first alignment layer; and
disposing a liquid crystal layer between the first and second substrates,
wherein the light illuminating unit includes a light source generating a light, and an optical device providing the generated light to the polarizing device,
wherein the optical device comprises a condensing mirror condensing the generated light, a first reflective mirror reflecting the condensed light, a fly eye lens spreading the reflected light, a second reflective mirror re-reflecting the spreaded light, and a collimator lens condensing the re-reflecting light,
wherein the light source is disposed at a inclination relative to the condensing mirror or the collimating lens is disposed to be inclined with respect to an optical axis of an incident light,
wherein the polarized light has a polarization direction substantially the same as the first direction,
wherein the light from the light source is partially polarized by the optical device, the partially polarized light has an anisotropic illuminance distribution by the inclination of the light source,
wherein the partially polarized light is supplied to the polarizing device.

19. The method according to claim 18, wherein the polarized light has a polarization direction substantially perpendicular to the first direction.

20. The method according to claim 18, further comprising:
coating a second alignment layer on the second substrate; and
irradiating polarized light from the polarizing device onto the second alignment layer.

21. The method according to claim 18, further comprising illuminating light having a polarization degree of 0.5 onto the alignment layer.

22. The method according to claim 18, wherein an alignment direction of the alignment layer is determined by side chains of the alignment layer.

23. The method according to claim 18, wherein an alignment direction of the first alignment layer is determined by main chains of the first alignment layer.

24. The method according to claim 18, wherein the first alignment layer is formed of at least one alignment material selected from the group consisting of a polyamic acid, polyethyleneimine, polyvinyl alcohol, polyamide, polyethylene, polyphenylenephthalamide, polyester, polyurethanes, and polymethylmethacrylate.

25. The method according to claim 18, wherein the first alignment layer is aligned in a direction perpendicular to a polarization direction.

26. The method according to claim 18, wherein the alignment layer is formed of polystyrene.

27. The method according to claim 18, wherein the alignment layer is aligned in a direction coinciding with a polarization direction.

28. The method according to claim 18, wherein the polarized light is illuminated to be incident substantially perpendicular to the alignment substrate.

29. The method according to claim 18, wherein the polarized light is illuminated to be incident at an angle to an axis perpendicular to the alignment substrate.

30. A method of fabricating liquid crystal display device, the method comprising:
forming gate lines and a common line on a first substrate;
forming data lines crossing the gate lines on the first substrate;
forming a plurality of common electrodes parallel to the data lines, and forming pixel electrodes alternating with the common electrodes;
forming a first alignment layer on the first substrate including the pixel electrodes;
rubbing the first alignment layer in a first rubbing direction;
transmitting light having anisotropic illuminance distribution from a light illuminating unit to a polarizing device generating polarized light; and irradiating polarized light from the polarizing device, having polarization of 0.50 onto the first alignment layer, wherein the light illuminating unit includes a light source generating a light, and an optical device providing the generated light to the polarizing device, wherein the optical device comprises a condensing mirror condensing the generated light, a first reflective mirror reflecting the condensed light, a fly eye lens spreading the reflected light, a second reflective mirror re-reflecting the spreaded light, and a collimator lens condensing the re-reflecting light, wherein the light source is disposed at a inclination relative to the condensing mirror or the collimating lens is disposed to be inclined with respect to an optical axis of an incident light, wherein the polarized light has a polarization direction substantially the same as the first rubbing direction, wherein the light from the light source is partially polarized by the optical device, the partially polarized light has an anisotropic illuminance distribution by the inclination of the light source, wherein the partially polarized light is supplied to the polarizing device.

31. The method according to claim 30, further comprising:
forming a black matrix on a second substrate;
forming a color filter layer on the black matrix;
forming an overcoat layer on the color filter layer; and
forming a second alignment layer on the overcoat layer.

32. The method according to claim 30, wherein the polarized light illuminated onto the first substrate is incident at an angle to a perpendicular to a surface of the first substrate.

33. The method according to claim 32, wherein a polarization direction of the polarized light is substantially perpendicular to the first rubbing direction of the first alignment layer.

* * * * *